[84.]
Arnold Tompkins'
Improved Cultivator.
No. 118,562.   Fig. 1.   Patented Aug. 29, 1871.
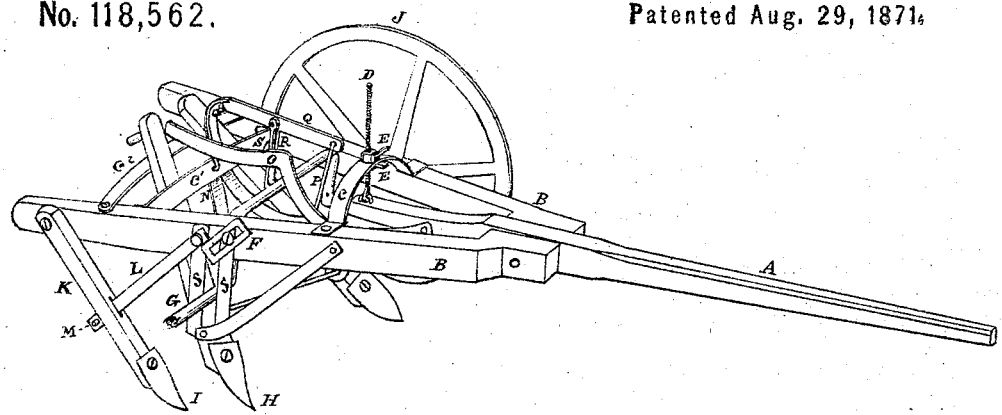
Fig 2.
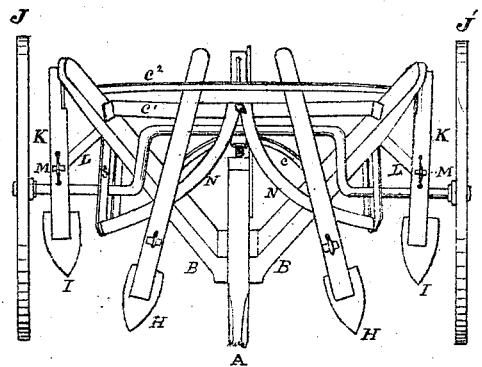
Witnesses,
H. A. Daniels
W. E. Raymond
Arnold Tompkins Inventor,
by C. S. Whitman Attorney
529 Seventh St
Washington D.C.

UNITED STATES PATENT OFFICE.

ARNOLD TOMPKINS, OF PARIS, ILLINOIS.

IMPROVEMENT IN CULTIVATORS.

Specification forming part of Letters Patent No. 118,562, dated August 29, 1871.

*To all whom it may concern:*

Be it known that I, ARNOLD TOMPKINS, of Paris, in the county of Edgar and in the State of Illinois, have invented certain Improvements in Corn-Cultivators; and do hereby declare that the following description, taken in connection with the accompanying drawing, hereinafter referred to, forms a full and exact specification of the same, wherein I have set forth the nature and principles of my said improvements, by which my invention may be distinguished from others of a similar class, together with such parts as I claim and desire to secure by Letters Patent.

My invention relates to that class of cultivators termed walking cultivators; and the nature thereof consists in certain modifications in the details and improvements in the construction of the same, hereinafter described and shown.

In the accompanying drawing which illustrates my invention and forms a part of the specification thereof, in which corresponding parts are illustrated by similar letters, Figure 1 is a view in perspective of the machine, with one of the wheels thereof removed in order to facilitate illustration. Fig. 2 is a rear elevation.

The construction, operation, and relative arrangement of the component parts of the machine are as follows:

The tongue A is pivoted between the side pieces B of the frame, which are connected and held firmly together by the transverse bars $c$ $c^1$ $c^2$. A screw-bolt, D, passes through an aperture in the curvilinear cross-piece C, and is attached by means of a staple to the rear end of the tongue. By means of the nuts E on the said bolt the plows may be inclined in and out of the ground and accurately adjusted—that is to say, when the nuts are turned downward the plows are inclined out, and when turned up they are inclined in. The depth of the furrow cut by the plows is accurately regulated by means of the plates F, resting upon the axle G, and provided with longitudinal apertures, through which passes a screw, by means of which they are secured to the side pieces B and adjusted. The said axle is arranged as near as may be in a vertical plane, which would cut the surface of the ground half-way between the points of the foremost and hindmost plows H and I. This position of the axle, and of the wheels J J' attached thereto, keeps the plows the same depth when the ground is uneven. If a ridge in the ground is to be crossed, the plows and wheels cross it at the same time, and if one wheel crosses an elevated place, it carries the two plows on its side over it at the same time, thereby rendering it unnecessary for the driver to guide the plows by hand. The standards K of the plows are attached to the diagonal bars L by means of wooden pins M passing through apertures in the ends of the said bars, so that when the plows strike obstacles the said wooden pins give way and the machine is uninjured. The standards of the two foremost plows are pivoted to the curvilinear stays N in such a manner that they may be guided with facility and made to follow, if necessary, a tortuous course. The plows are raised and lowered by means of the lever O, pivoted to the rear end of the tongue, and attached by means of the connecting-rod P to one end of the cross-piece Q, the other end of which is secured to the transverse bar $c^1$. The standard R, attached to the axle upon which the cross-piece vibrates, is provided with a catch, S, beneath which the lever is secured when the plows are raised.

Having thus described the construction and operation of my invention, I claim, and desire to secure by Letters Patent—

The combination of the axle G, guide-pieces S, plates F, and side pieces, when operating together as described.

In testimony that I claim the foregoing I have hereunto set my hand this 10th day of February, 1871.

ARNOLD TOMPKINS.

Witnesses:
HENRY E. RIVES,
R. B. LAMON.